United States Patent [19]
Saniford et al.

[11] 3,851,171
[45] Nov. 26, 1974

[54] METHOD FOR TRACING THE FLOW OF WATER IN SUBTERRANEAN FORMATIONS

[75] Inventors: Burton B. Saniford, Placentia; Robert K. Knight, Fullerton, both of Calif.

[73] Assignee: Union Oil Company of California, Los Angeles, Calif.

[22] Filed: Oct. 10, 1973

[21] Appl. No.: 404,931

[52] U.S. Cl. .................................. 250/259, 250/302
[51] Int. Cl. .............................................. G01t 1/00
[58] Field of Search .......... 250/259, 260, 302, 312, 250/365, 373, 461, 303; 252/301.3 R, 301.2 C, 301.2 R

[56] References Cited
UNITED STATES PATENTS

| | | | |
|---|---|---|---|
| 2,096,099 | 10/1937 | Gaugler | 250/302 |
| 3,002,091 | 9/1961 | Armstrong | 250/259 |
| 3,118,060 | 1/1964 | Klein | 250/302 |
| R22,530 | 8/1944 | Sell | 250/302 |

*Primary Examiner*—Harold A. Dixon
*Attorney, Agent, or Firm*—Dean Sandford; Richard C. Hartmann

[57] ABSTRACT

A method for tracing the flow of water through a subterranean formation in which a water-soluble substituted poly(hydroxyalkyl) bis(triazinylamino)stilbene is added to the water at a selected point and samples of water are withdrawn from the formation at one or more points remote from the point of addition and analyzed for the presence of this agent.

15 Claims, 1 Drawing Figure

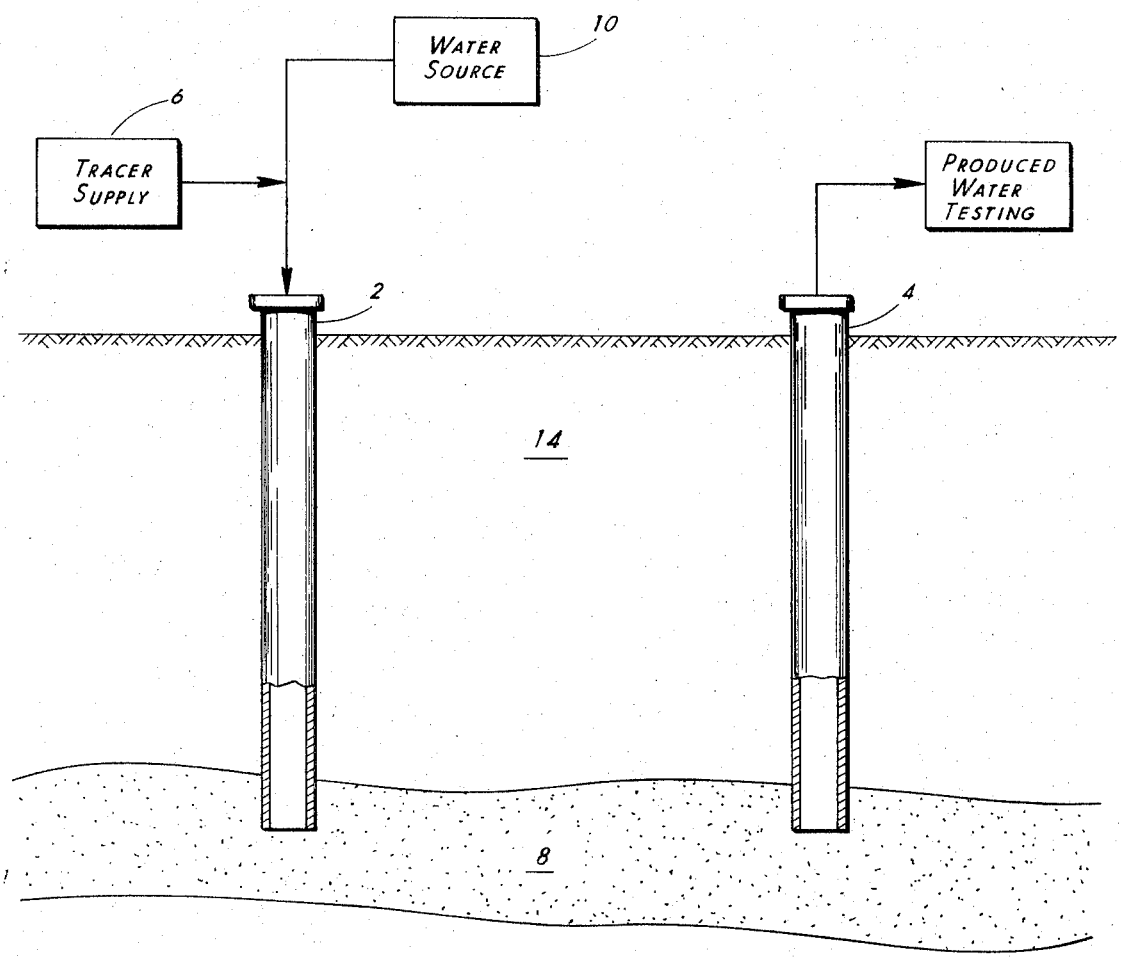

METHOD FOR TRACING THE FLOW OF WATER IN SUBTERRANEAN FORMATIONS

This invention relates to the study of water flow, and more particularly is concerned with a method for tracing the flow of water in subterranean formations.

It is often desirable to ascertain the flow pattern of water through porous subterranean formations, such as petroleum reservoirs. Methods for tracing the flow of water in subterranean strata are useful in the oil well treating field, and are especially useful in tracing the flow of an aqueous flooding medium through an oil-bearing formation as from an input to an output well. Accordingly, it has been suggested that various agents be added to the water at an injection point and that a sample of the water be withdrawn at a remote point and analyzed for the presence of the tracer material to indicate the passage of the water from the injection point to the recovery point.

For a material to be useful as a chemical tracer in the study of the flow of subterranean water, the tracer must be stable and relatively unabsorbed and unreactive in the presence of formation water, oil and rock. Further, the tracer must be easily identified at low concentrations in the produced waters, preferably by simple tests. It is also desirable that the tracer be relatively inexpensive and easy to handle, and possess such properties as high water solubility and low toxicity. While several materials have been proposed which are generally useful as tracers, it frequently becomes necessary in the study of complex flow systems to inject a number of different tracer agents at different injection points and to analyze water withdrawn at one or more recovery points for the presence of these tracers. Also, one or more of the known tracer materials may not be useful in a particular formation because of interference by natural or injected constituents in the formation. Thus, there exists a demand for a number of chemical materials suitable as tracers.

Accordingly, a principal object of the present invention is to provide a method for tracing the flow of water employing a distinctive chemical tracer.

Another object is to provide a method for studying the flow of aqueous media through a subterranean petroleum reservoir form an injection well to a recovery well.

Other objects and advantages of the invention will be apparent to those skilled in the art from the following more detailed description. The accompanying drawing is an illustration of a subterranean formation shown in cross section and diagrammatically illustrates the process of this invention as practiced in such a formation.

In accordance with the method of the present invention for tracing the flow of water in subterranean formations, a water-soluble substituted poly(hydroxyalkyl) bis (triazinylamino)stilbene is added to the water at an origin point and portions of the water obtained at a recovery point analyzed for the substituted stilbene as an indication of derivation or flow from the origin point. The practice of the process of this invention in a subterranean formation can be more readily understood by reference to the drawing, wherein a subterranean formation 8, overlain by overburden 14, is penetrated by injection well 2 and producing well 4, the wells 2 and 4 being spaced apart in subterranean formation 8. In accordance with the practice of this invention, a water-soluble tracer from tracer supply 6 is added to the water supplied from water source 10, and the water-tracer solution is injected into the subterranean formation 8 through well 2, and displaced through subterranean formation 8. Fluids are recovered from subterranean formation 8 through producing well 4, and the produced water tested for the presence of the tracer.

The substituted poly(hydroxyalkyl) bis(-triazinylamino) stilbenes, hereinafter referred to as PBTS, employed in the treating solutions used in the practice of this invention are organic compounds represented by the following generalized formula

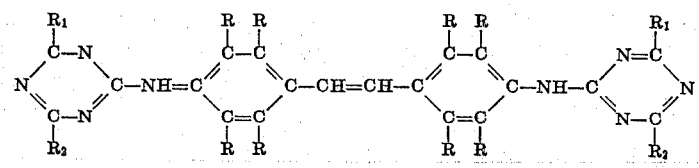

wherein R represents the same or different members of the group consisting of (1) hydrogen, (2) alkyl radicals containing up to 4 carbon atoms, exemplary of which are methyl, ethyl, propyl and butyl radicals, (3) sulfo radicals and the metal and ammonium salts thereof such as sodium, potassium, lithium and ammonium sulfonates, and (4) hydroxyl radicals; $R_1$ represents the same or different members of the group consisting of (1) hydroxy-substituted alkyl amino or aryl amino radicals, and (2) hydroxy-substituted alkyloxy or aryloxy radicals exemplary of which are hydroxyethyl amino, hydroxy-substitued anilino, β-hydroxy ethyloxy, β-hydroxy propyloxy and p-hydroxy phenoxy radicals; and $R_2$ represents the same or different members of the group consisting of (1) hydroxy- or sulfo- substituted alkyl amino or aryl amino radicals, and the metal and ammonium salts thereof and (2) hydroxy- or sulfo- substituted alkyloxy or aryloxy radicals and the metal and ammonium salts thereof exemplary of which are hydroxyethyl amino, 3-hydroxy anilino, 3-sulfoanilino, β-hydroxyethyloxy, β-hydroxy propyloxy, and p-hydroxy phenoxy radicals.

A preferred substituted poly(hydroxyalkyl) bis(-triazinylamino)stilbene is 4,4'-bis(4-(3-sulfoanilino)-6-(bis-2-hydroxyethyl)-amino)-1,3,5-triazin-2-ylamino)stilbene-2,2'-disulfonic acid tetrasodium salt.

Another commercially available substituted poly(hydroxyalkyl) bis(triazinylamino)stilbene which is also preferred for use in the practice of the invention is marketed by the CIBA-GEIGY Corporation under the trademark TINAPAL GS.

The above-described PBTS can be prepared by nitrating stilbene with nitric acid and then sulfonating the reaction product with sulfuric acid and neutralizing with sodium hydroxide to obtain the sodium salt of the dinitrostilbene disulfonate. Melamine is separately reacted with sodium 3-sulfoaniline and this product reacted with the dinitrostilbene sodium disulfonate. The resulting product is then ethoxylated with ethylene oxide to yield the bis(2-hydroxyethyl)amino derivative.

The water-soluble PBTS is employed at concentrations sufficient to enable detection at the recovery point after dilution with formation water. Accordingly, it is preferred that sufficient PBTS be added at the origin to produce a concentration of at least 1 ppm at the recovery point. Although generally the PBTS can be added up to its limit of solubility, usually more dilute concentrations are preferred. In one mode of practicing the invention, PBTS is continuously added to the injection water in an amount sufficient to provide a concentration of about 20 ppm to 500 ppm, and even more preferably from about 50 ppm to 200 ppm at the origin point. In another mode of practicing the invention, a slug of relatively concentrated aqueous PBTS solution, such as produced by the aforementioned technique, is injected at an origin point, such as a water injection well communicating with a subterranean formation. The volume of PBTS solution injected can vary over a wide range, but typically is about 5 to 1,000 barrels. The PBTS solution is displaced through the formation with an aqueous flooding medium. Water samples are withdrawn from the formation at one or more recovery wells spaced apart from the injection well and analyzed for the presence of PBTS to indicate the derivation of water from the input well. The PBTS can be dissolved in the injection water and this solution injected into the formation; or alternatively, a more concentrated solution of the PBTS in a portion of the injection water can first be prepared, and this solution admixed with the water being injected into the formation. PBTS can be employed as a tracer a wide variety of aqueous fluids, such as fresh water, produced water, brine, sea water, aqueous polymer solutions, and the like.

The analysis for the presence of PBTS in water obtained at the recovery point can be accomplished by exposing a sample of the recovered water to ultraviolet light. The presence of PBTS in the water causes the water to luminesce under ultraviolet light, with the amount of luminescense being proportional to the concentration of PBTS in the water. Since some oils luminesce under ultraviolet light, oil should be removed from the sample prior to conducting the analysis for PBTS, or the sample compared against a PBTS-free blank sample of the recovered water.

A simple test procedure for detecting the presence of PBTS in water can be conducted as follows:

1. Filter the sample of water to be analyzed through Whatman No. 1 filter paper two times to remove oil.
2. Place a drop of the solution on a piece of dry filter paper and expose the test specimen to ultraviolet light and observe the degree of luminescense. A degree of luminescence greater than that of a PBTS-free sample of the water indicates the presence of PBTS in the water.
3. Compare the degree of luminescence of the sample to that of standard solutions of PBTS to determine the approximate concentration of PBTS. Solutions containing 0.01, 0.1, 1, 10, 50 and 100 ppm of PBTS are convenient standards.

The presence of PBTS in the recovered water indicates the flow of water from the origin point.

Although the invention has been particularly described in conjunction with the tracing of the flow of water through a subterranean formation, it also can be used to trace the origin of water from any source, such as the flow of water through pipeline and sewer networks, rivers and streams; within bodies of water such as lakes, reservoirs and marine bodies; and in tracing the leakage of water from tanks, dams, pipelines and the like.

The invention is further illustrated by the following examples which are illustrative of specific modes of practicing the invention and are not intended as limiting the scope of the invention as defined by the appended claims.

Example 1

Standard solutions of PBTS in produced water recovered from a well located in a field to be tested are prepared by the following method. The produced water is twice filtered through Whatman No. 1 filter paper and 4,4'-bis(4-(3-sulfoaniline)-6-((bis-2-hydroxyethyl)-amino)-1,3,5-triazin-2-ylamino)stilbene-2,2'-disulfonic acid tetrasodium salt is added to separate portions of the filtered water to obtain solutions having the following concentrations of the additive: 0.01, 0.1, 1, 10, 50 and 100 ppm.

A drop of each of these solutions is placed on a piece of dry filter paper and the test speciments placed under ultraviolet light. The relative luminescence of each specimen is observed. Luminescence in detectable in the specimen containing 0.01 ppm of the PBTS, with the brightness of the luminescence increasing with concentration.

Example 2

The method of this invention is utilized to determine if water injected into a water injection well is being received at a nearby producing well. Standard solutions of 1, 10, 50 and 100 ppm of a PBTS marketed by the CIBA-GEIGY Corporation under the trademark TINAPAL GS in twice filtered produced water are prepared substantially as described in Example 1.

Next, a solution of approximately 2,140 ppm of TINAPAL GS in produced water is prepared. Approximately 100 barrels of this solution is injected into the well along with the normally injected water to provide a mixture containing about 500 ppm of the PBTS. Samples of the produced water obtained daily from a nearby producing well are analyzed for PBTS by the technique described in Example 1. The results of these tests are reported in Table 1. FRom these data it is concluded that at least a portion of the water injected into the injection well flows to the production well, and that the transit time of water flowing from the injection to the production well is about three days.

Table 1

| Days After Injection of PBTS Solution | Concentration of PBTS in Produced Water, ppm |
| --- | --- |
| 1 | none |
| 2 | none |
| 3 | 1 |
| 4 | <1 |
| 5 | low |
| 6 | very low |

While particular embodiments of the invention have been described, it will be understood, of course, that the invention is not limited thereto since many modifications can be made and it is intended to include within the invention such modifications as are within the scope of the claims.

Having now described the invention, we claim:

1. A method for tracing the flow of water which comprises adding a water-soluble substituted poly(hydroxyalkyl) bis (triazinylamino)stilbene to the water at an origin point, recovering a sample of water at a recovery point, and analyzing the sample for the presence of said agent.

2. The method defined in claim 1 wherein said substituted poly(hydroxalkyl) bis(triazinylamino)stilbene is characterized by the following generalized formula:

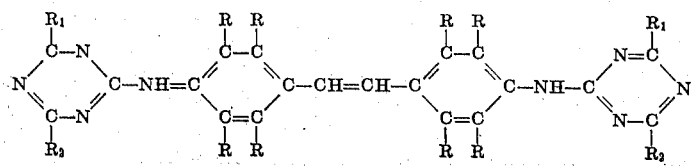

wherein R represents the same or different members of the group consisting of (1) hydrogen, (2) alkyl radicals containing up to 4 carbon atoms, (3) sulfo radicals and the metal and ammonium salts thereof, and (4) hydroxy radicals; $R_1$ represents the same or different members of the group consisting of (1) hydroxy-substituted alkyl amino or aryl amino radicals, and (2) hydroxy-substituted alkyloxy or aryloxy radicals; and $R_2$ represents the same or different members of the group consisting of (1) hydroxy- or sulfo-substituted alkyl amino or aryl amino radicals and the metal and ammonium salts thereof, and (2) hydroxy- or sulfo-substituted alkyloxy or aryloxy radicals and the metal and ammonium salts thereof.

3. The method defined in claim 1 wherein said substituted poly(hydroxyalkyl) bis(triazinylamino)stilbene is a 4,4'-bis(4-(3-sulfoanilino)-6-((bis-2-hydroxyethyl)-amino)-1,3,5-triazin-2-ylamino)stilbene-2,2'-disulfonic acid tetrasodium salt.

4. The method defined in claim 1 wherein sufficient of said water-soluble agent is added at the origin point to produce a detectable concentration at a recovery point.

5. The method defined in claim 1 wherein about 20 ppm to 500 ppm of said agent is added to the water at the origin point.

6. The method defined in claim 1 wherein said recovered water is analyzed for the presence of said water-soluble substituted poly(hydroxyalkyl) bis(triazinylamino)stilbene by determining the luminosity of the aqueous solution when exposed to ultraviolet light.

7. A method for tracing the flow of an aqueous media through a subterranean petroleum reservoir from an input well to an output well, which comprises:
adding a water-soluble substituted poly(hydroxylalkyl) bis(triazinylamino)stilbene to the aqueous media at the input well;
recovering a sample of water at the output well; and
analyzing the recovered water for said agent as an indication of water derivation from the input well.

8. The method defined in claim 7 wherein a slug of aqueous substituted poly(hydroxyalkyl) bis(triazinylamino)stilbene is injected into the input well and followed by the injection of aqueous media.

9. The method defined in claim 7 wherein said substituted poly(hydroxyalkyl) bis(triazinylamino)stilbene is characterized by the following generalized formula

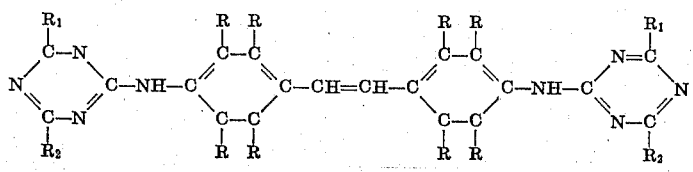

wherein R represents the same or different members of the group consisting of (1) hydrogen, (2) alkyl radicals containing up to 4 carbon atoms, (3) sulfo radicals and the metal and ammonium salts thereof, and (4) hydroxy radicals; $R_1$ represents the same or different members of the group consisting of (1) hydroxy-substituted alkyl amino or aryl amino radicals, and (2) hydroxy-substituted alkyloxy or aryloxy radicals; and $R_2$ represents the same or different members of the group consisting of (1) hydroxy- or sulfo- substituted alkyl amino or aryl amino radicals and the metal and ammonium salts thereof, and (2) hydroxy- or sulfo-substituted alkyloxy or aryloxy radicals and the metal and ammonium salts thereof.

10. The method defined in claim 7 wherein said substituted poly(hydroxyalkyl) bis(triazinylamino)stilbene is a 4,4'-bis(4-(3-sulfoanilino)-6-((bis-2-hydroxyethyl)-amino)-1,3,5-triazin-2-ylamino)stilbene-2,2'-disulfonic acid tetrasodium salt.

11. The method defined in claim 7 wherein sufficient of said water-soluble agent is added at the input well to produce a detectable concentration at the output well.

12. The method defined in claim 7 wherein about 20 ppm to 500 ppm of said agent is added to the water at the input well.

13. The method defined in claim 7 wherein said recovered water is analyzed for the presence of said water-soluble substituted poly(hydroxyalkyl) bis(triazinylamino)stilbene by determining the luminosity of the aqueous solution when exposed to ultraviolet light.

14. A method for tracing the flow of aqueous flooding medium through a petroleum reservoir from an input well to an output well, which comprises:
adding a water-soluble substituted poly(hydroxyalkyl) bis(triazinylamino)stilbene to the aqueous media at the input well in sufficient quantity to produce a detectable concentration at the output well;
thereafter injecting aqueous flooding medium into said input well;
obtaining a sample of recovered water from a spaced output well; and
analyzing said sample of recovered water for the presence of said substituted poly(hydroxyalkyl)

bis(triazinylamino)stilbene by determining its luminosity under ultra violet light.

15. The method defined in claim 14 wherein about 20 ppm to 500 ppm of said agent is added to the water at the input well.

* * * * *